United States Patent
Kather et al.

(10) Patent No.: US 9,478,983 B2
(45) Date of Patent: Oct. 25, 2016

(54) CURRENT-LIMITING BATTERY USAGE WITHIN A CORDED ELECTRONIC DEVICE

(75) Inventors: Ryan Kather, Cicero, NY (US); Adam Clifford, Homer, NY (US); Runhong Deng, Victor, NY (US)

(73) Assignee: Honeywell Scanning & Mobility, Fort Mill, SC (US)

( * ) Notice: Subject to any disclaimer, the term of this patent is extended or adjusted under 35 U.S.C. 154(b) by 1113 days.

(21) Appl. No.: 13/570,587

(22) Filed: Aug. 9, 2012

(65) Prior Publication Data

US 2014/0042814 A1     Feb. 13, 2014

(51) Int. Cl.
| | |
|---|---|
| *G06K 7/10* | (2006.01) |
| *H02J 1/10* | (2006.01) |
| *H02J 7/34* | (2006.01) |
| *H02J 1/14* | (2006.01) |
| *H02J 7/00* | (2006.01) |

(52) U.S. Cl.
CPC .. *H02J 1/10* (2013.01); *H02J 1/14* (2013.01); *H02J 7/0068* (2013.01); *H02J 7/34* (2013.01); *Y10T 307/587* (2015.04)

(58) Field of Classification Search
CPC .... H01M 10/441; H01M 2/34; H02J 7/0068; H02J 1/10; H02J 1/14; H02J 7/0013; H02J 7/0021; H02J 7/0026; H02J 7/0057; H02J 7/0086; H02J 7/045; H02J 7/06; H02J 7/34; Y02T 10/7055; Y10T 307/587
USPC ............ 235/472.01, 472.02, 472.03, 462.25
See application file for complete search history.

(56) References Cited

U.S. PATENT DOCUMENTS

| | | | |
|---|---|---|---|
| 7,775,438 B2 | 8/2010 | Beckhusen et al. | |
| 8,157,177 B1 | 4/2012 | O'Donnell et al. | |
| 2008/0054855 A1* | 3/2008 | Hussain | H02J 7/0057 320/162 |
| 2008/0258688 A1* | 10/2008 | Hussain | H02J 7/06 320/145 |
| 2010/0016034 A1* | 1/2010 | Lindqvist | H02J 7/34 455/573 |
| 2011/0261619 A1* | 10/2011 | Shibata | G11C 11/5628 365/185.03 |
| 2012/0242290 A1* | 9/2012 | Asakura | G01R 31/3658 320/118 |
| 2013/0043829 A1* | 2/2013 | Gurlahosur | H02J 7/045 320/107 |
| 2013/0113415 A1* | 5/2013 | Chen | B08B 3/022 320/107 |

OTHER PUBLICATIONS

Texas Instruments, Single-Chip Charge and System Power-Path Management IC (bqTINY™), www.ti.com, SLUS618H—Aug. 2004, Revised Oct. 2009, 37 pages.

* cited by examiner

*Primary Examiner* — Thien M Le
(74) *Attorney, Agent, or Firm* — Additon, Higgins & Pendleton, P.A.

(57) ABSTRACT

This disclosure describes techniques for operating a corded electronic device in which a battery and a power control unit manage power draw from an external power source electrically coupled to the corded electronic device using a physical cord, such as a universal serial bus (USB) cable. The power control unit automatically supplements an electrical current continuously drawn by the corded electronic device from the external power source with an electrical current from the battery, when needed. Moreover, the power control unit operates to limit the current drawn from the external power source and the physical cord so as to ensure the current does not exceed any limitations or requirements associated with the external power source or the physical cord.

27 Claims, 7 Drawing Sheets

CURRENT-LIMITING BATTERY USAGE WITHIN A CORDED ELECTRONIC DEVICE

TECHNICAL FIELD

This disclosure relates electronic devices, and more particularly, to techniques for power management within an electronic device.

BACKGROUND

Indicia-reading terminals and scanners (which may be referred to collectively as "terminals") are available in multiple varieties. Such terminals are commonly used to read and decode information encoded in decodable or information-bearing indicia. For example, such decodable or information-bearing indicia are widely used in a variety of applications, including encoding shipping and tracking information for packages, patient identification in hospitals, and various retail applications, as well as on any number of forms and documents including, but not limited to, tax forms, order forms, transaction forms, survey forms, delivery forms, prescriptions, receipts, newspapers, product documents, reports, and the like.

In various existing applications, the use of the decodable or information-bearing indicia described above, such as bar code symbols, has become the norm for identifying products and inventory. In some cases, a particular item may be marked with decodable indicia associated with a description of the item, as well as other attributes (for example, price or patient identification) related to the item that are stored in a database of a host device or network system. The indicia-reading terminals and scanners described above may be used to read the decodable indicia and provide the resultant reading as input information to a variety of host devices. In some cases, the reading may be provided to the host devices via base units or "cradles," which may communicate with a particular indicia-reading terminal or scanner. Examples of host devices include hospital patient care systems, computers (both stationary and portable), personal digital assistants (PDA), portable data terminals (PDT), point of sale (POS) terminals, transaction terminals, cash registers, servers, and similar devices.

According to some techniques, the indicia-reading terminals and scanners described above, and electronic devices generally, may be tethered or physically "corded" to one or more external power sources configured to provide operating power to the indicia-reading terminals and scanners. For example, to perform one or more functions, a particular corded indicia-reading terminal or scanner may draw operating power in the form of an electrical current from a power source that is located externally relative to the electronic device, and to which the indicia-reading terminal or scanner is corded.

SUMMARY

This disclosure relates to techniques for managing power draw in electronic devices. For example, techniques are described in which a battery and a power control unit are used to manage power draw limitations in a corded electronic device in which operating power in the form of an electrical current is received over a physical cord by an electrical interface, such as a universal serial bus (USB) interface. The power control unit and battery located within the corded electronic device operate to limit current drawn from a corded electrical interface of the device so as to ensure that the current drawn does not exceed requirements associated with the corded electrical interface. Moreover, the device may draw additional power from the battery as necessary to perform one or more operations that may otherwise exceed the limitations of the corded electrical interface.

In one example, a method of operating a corded electronic device may include determining a magnitude of a first electrical current that is required for one or more components of the corded electronic device to perform one or more operations, determining whether the magnitude of the first electrical current is greater than a current limit value associated with a second electrical current received by the corded electronic device from an external power source located outside of the corded electronic device, and providing the first electrical current to the one or more components to perform the one or more operations. In this example, providing the first electrical current may include, in the event the magnitude of the first electrical current is greater than the current limit value, providing the second electrical current in conjunction with a third electrical current received from a battery power source located within the corded electronic device to the one or more components as the first electrical current, and in the event the magnitude of the first electrical current is less than or substantially equal to the current limit value, providing the second electrical current to the one or more components as the first electrical current.

In another example, a corded electronic device may include a power control unit configured to provide a first electrical current to one or more components of the corded electronic device to perform one or more operations, an external power terminal electrically coupled to the power control unit and configured to receive a second electrical current from an external power source located outside of the corded electronic device, and a battery power source located within the corded electronic device and electrically coupled to the power control unit, wherein the battery power source is configured to provide a third electrical current to the power control unit. In this example, to provide the first electrical current, the power control unit may be configured to determine a magnitude of the first electrical current that is required for the one or more components to perform the one or more operations, determine whether the magnitude of the first electrical current is greater than a current limit value associated with the second electrical current, and in the event the magnitude of the first electrical current is greater than the current limit value, provide the second electrical current in conjunction with the third electrical current to the one or more components as the first electrical current, and in the event the magnitude of the first electrical current is less than or substantially equal to the current limit value, provide the second electrical current to the one or more components as the first electrical current.

In still another example, a corded electronic device may include means for determining a magnitude of a first electrical current that is required for one or more components of the corded electronic device to perform one or more operations, means for determining whether the magnitude of the first electrical current is greater than a current limit value associated with a second electrical current received by the corded electronic device from an external power source located outside of the corded electronic device, and means for providing the first electrical current to the one or more components to perform the one or more operations. In this example, the means for providing the first electrical current may include means for, in the event the magnitude of the first electrical current is greater than the current limit value, providing the second electrical current in conjunction with a third electrical current received from a battery power source located within the corded electronic device to the one or more components as the first electrical current, and in the event the magnitude of the first electrical current is less than or substantially equal to the current limit value, providing the second electrical current to the one or more components as the first electrical current.

The details of one or more examples are set forth in the accompanying drawings and the description below. Other features, objects, and advantages in addition to those described below will be apparent from the description and drawings, and from the claims.

DETAILED DESCRIPTION

Figure 1:
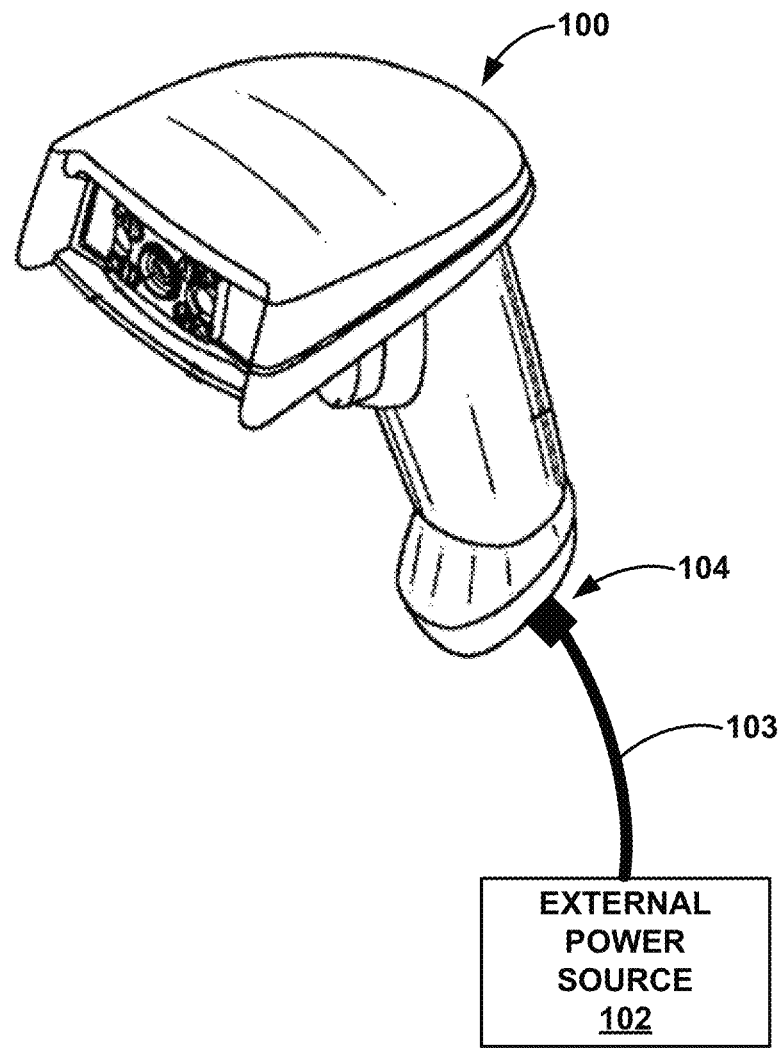
FIG. 1 is a diagram that illustrates one example of a corded electronic device, consistent with the techniques of this disclosure.

FIG. 1 is a diagram that illustrates one example of a corded electronic device, consistent with the techniques of this disclosure. In the example shown in FIG. 1, corded electronic device 100 comprises a corded handheld electronic scanning device configured to perform one or more scanning operations. The techniques of this disclosure are described in the context of such a corded electronic scanning device. Nevertheless, the techniques described herein may be applicable to corded electronic devices generally, such as, for example, any of a variety of handheld or mobile electronic devices that receive electrical power via a physical cord or cable.

As shown in FIG. 1, device 100 has a generally rectangular housing, which both protects the internal components of device 100 from the elements and wear associated with the use of device 100, and defines the ergonomic and functional interaction of a user, or an operator, with device 100. As described in greater detail below, in some examples, device 100 may incorporate one or processors, memory devices, user interface devices, and communication devices, to perform the one or more operations attributed to device 100 in this disclosure. In the particular example of FIG. 1, because device 100 comprises a corded electronic scanning device, as explained above, device 100 may further incorporate one or more scanning interface devices for performing the one or more scanning operations of device 100.

For example, the one or more scanning interface devices may include one or more lighting devices (e.g., light emitting diode (LED) or incandescent lighting devices) for lighting an area of an object being scanned using device 100, one or more image capture devices (e.g., one or more charge-coupled device (CCD), complementary metal-oxide semiconductor (CMOS) arrays, charge injection devices (CID), or camera devices, generally) and processing devices (e.g., one or more microprocessors, microcontrollers, application specific integrated circuits (ASICs), or field programmable gate arrays (FPGAs) configured to process one or more captured images).

Additionally, device 100 may incorporate one or more user interface devices, which may include one or more display devices (e.g., one or more liquid crystal display (LCD) or light emitting diode (LED) display devices or discrete LEDs), one or more touchscreen devices (e.g., one or more resistive or capacitive touchscreen devices) integrated with the one or more display devices, as well as one or more keypad or switch-membrane devices. Additionally, device 100 may incorporate one or more user interface devices configured to provide auditory and/or palpable feedback to a user (e.g., one or more speaker devices, or vibration devices).

Furthermore, device 100 may further incorporate one or more communication devices, including one or more devices operable to provide wired or wireless connectivity to device 100. For example, the one or more communication devices may provide network connectivity to device 100 using the Ethernet and/or Wi-Fi communication technologies, provide cellular telephone network connectivity to device 100 using the Global System for Mobile Communications (GSM) and/or Code Division Multiple Access (CDMA) communication technologies, provide short-range wireless connectivity to device 100 using the Bluetooth, radio frequency identification (RFID), and/or Infrared Data Association (IrDA) communication technologies, as well as enable global positioning system (GPS) functionality within device 100.

In general, device 100 receives continuous electrical power from an external power source 102 over a physical cord 103 by an electrical interface 104, such as a universal serial bus (USB) interface. In some examples, external power source 102 may comprise an external battery-based power source (e.g., a battery pack) or another external power source (e.g., a "wall" power supply, such as a power adapter) electrically coupled to device 100 via cord 103 and electrical interface 104 so as to provide the continuous electrical power in the form of an electrical current to device 100. An internal power control unit of device 100 receives the continuous electrical power from external cord 103 and provides an electrical current to one or more components of device 100 to perform one or more operations of device 100, e.g., one or more scanning operations described above. For example, the power control unit of device 100 may be configured to provide the electrical current to the internal one or more components of device 100 having a magnitude that is required for the components to perform the one or more operations.

In some instances, a magnitude of the electrical current provided to the components may be greater than a maximum current value specified for or otherwise associated with the electrical current received by device 100 from external power source 102 located outside of device 100. For example, the magnitude of the electrical current required for certain operations by the internal components of device 100 may exceed one of 100 milliamps and 500 milliamps, which constitute maximum current draw values specified by current USB standards for so-called "low-power" and "high-power" devices, respectively. In such instances, to provide the electrical current to the one or more components, the power control unit of device 100 may be configured to automatically supplement the continuous electrical current received by device 100 from external power source 102 with an electrical current received from a battery power source located within device 100. In other instances where the magnitude of the electrical current provided to the one or more components is not greater than the current limit value, device 100 may be configured to provide the electrical current to the one or more components by providing only the electrical current received by device 100 from external power source 102.

In this way, the internal power control unit of device 100 ensures that the current drawn from external power source 102 by way of cord 103 and electrical interface 104 does not exceed requirements specified for or associated with those components (i.e., any of external power source 102, cord 103, and electrical interface 104), even though the electrical power received from external power source 102 is continuously received by device 100 and always used for the operation of device 100. Moreover, the power control unit ensures that the internal components of device 100 have sufficient power to perform any required operations, even though the electrical power required for a given operation or series of operations may exceed the requirements of external power source 102, cord 103, or electrical interface 104.

In this manner, device 100 of FIG. 1 represents an example of a corded electronic device comprising a power control unit configured to provide a first electrical current to one or more components of the corded electronic device to perform one or more operations, an external power terminal electrically coupled to the power control unit and configured to receive a second electrical current from an external power source located outside of the corded electronic device, and a battery power source located within the corded electronic device and electrically coupled to the power control unit. The battery power source is configured to provide a third electrical current to the power control unit. To provide the first electrical current, the power control unit is configured to determine a magnitude of the first electrical current that is required for the one or more components to perform the one or more operations, determine whether the magnitude of the first electrical current is greater than a current limit value associated with the second electrical current, and in the event the magnitude of the first electrical current is greater than the current limit value, provide the second electrical current in conjunction with the third electrical current to the one or more components as the first electrical current, and in the event the magnitude of the first electrical current is less than or substantially equal to the current limit value, provide the second electrical current to the one or more components as the first electrical current.

Figure 2:
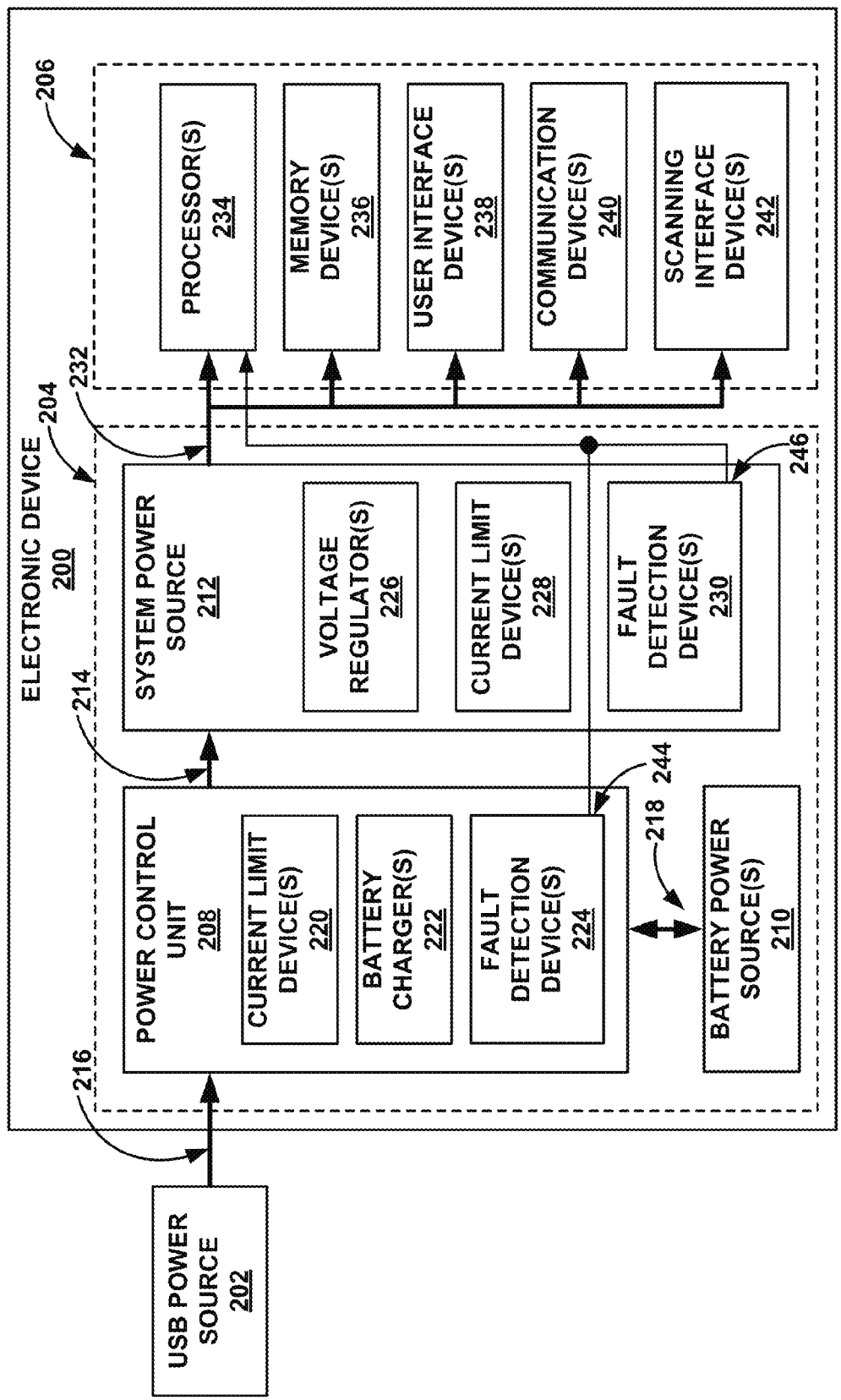
FIG. 2 is a functional block diagram of the example corded electronic device of FIG. 1, consistent with the techniques of this disclosure.

FIG. 2 is a functional block diagram of the example corded electronic device 100 of FIG. 1, consistent with the techniques of this disclosure. As shown in FIG. 2, corded electronic device 200 includes a power supply module 204 and a logic device module 206. As also shown in FIG. 2, device 200 is electrically coupled to a USB power source 202 located outside of device 200 via a cord, or an equivalent means, by which device 200 is configured to receive an electrical current (i.e., current 214) from USB power source 202, as will be described in greater detail below. As described herein, device 200 and the various components thereof may be an electronic system or device of any kind, including any combination of discrete electronic components, digital and/or analog circuitry, and electronic sub-systems or sub-devices of any kind. As previously explained, in some examples, device 200 may be a corded electronic scanning device.

Specifically, power supply module 204 of device 200 includes a power control unit 208 that, in turn, includes one or more current limit device(s) 220, one or more battery charger(s) 222, and one or more fault detection device(s) 224. Furthermore, power supply module 204 also includes one or more battery power source(s) 210, and a system power source 212, which, in turn, includes one or more voltage regulator(s) 226, one or more current limit device(s) 228, and one or more fault detection device(s) 230. Additionally, logic device module 206 of device 200 includes one or more processor(s) 234, one or more memory device(s) 236, one or more user interface device(s) 238, one or more communication device(s) 240, and one or more scanning interface device(s) 242, which may be collectively referred to herein as "one or more components" of device 200.

As shown in the example of FIG. 2, power control unit 208 is electrically coupled to USB power source 202, battery power source(s) 210, and system power source 212. As depicted in FIG. 2, power control unit 208, battery power source(s) 210, and system power source 212 are included within power supply module 204, which, in turn, is included within device 200, while USB power source 202 is located outside of device 200. In particular, in the example of FIG. 2, power control unit 208 is configured to provide a first electrical current 214 from one or more of USB power source 202 and battery power source(s) 210 to system power source 212 via, e.g., one or more switching devices controlled by one or more logic devices, or "units," included within power control unit 208, as will be described in greater detail below with reference to FIG. 3. For example, as shown in FIG. 2, to provide current 214 to system power source 212, power control unit 208 is configured to receive a second electrical current 216 from USB power source 202. In some instances (e.g., when a magnitude of current 214 that is required for the one or more components of device 200 described above to perform one or more operations is greater than a current limit value associated with current 216), to provide current 214, power control unit 208 is further configured to receive a third electrical current 218 from battery power source(s) 210. Additionally, as also shown, in still other instances (e.g., when the magnitude of current 214 is less than the current limit value, and when charging battery power source(s) 210), power control unit 208 is configured to provide at least a part of current 216 as current 218 to battery power source(s) 210, rather than receiving current 218 from battery power device(s) 210.

In the example of FIG. 2, power control unit 208 is configured to provide current 214 to the one or more components of device 200 included within logic device module 206 via system power source 212, which may comprise one or more power conversion devices or related circuitry configured to convert current 214 for use by the one or more components to perform the one or more operations. For example, system power source 212 may include one or more linear voltage regulators, switching (which may also be referred to as "switch-mode") voltage regulators, or any combination thereof, that are configured to convert current 214 into one or more voltage(s) and/or current(s) 232 for use by the one or more components. Additionally, system power source 212 may further include one or more current limit device(s) 228 configured to limit a current of each of voltage(s) and/or current(s) 232 derived using current 214, e.g., to prevent excessive currents from being drawn by the one or more components under normal operating conditions, as well as in cases of fault conditions, such as component failure. Finally, system power source 212 may also include one or more fault detection device(s) 230 configured to detect fault conditions present within system power source 212, such as, e.g., over- and/or under-voltage and -current conditions of voltage(s) and/or currents) 232 that may adversely affect the one or more components to which the voltage(s) and/or current(s) 232 are provided. In the example of FIG. 2, fault detection device(s) 230 may be operable to communicate with at least one of the one or more of the components (as depicted in FIG. 2, at least with processor(s) 234) via one or more fault condition signal(s) 246, to indicate any such fault conditions that may be present within system power source 212 to the one or more components.

Also in the example of FIG. 2, as already described, power control unit 208 may include current limit device(s) 220, which may be configured to limit one or more of current 216 provided from USB power source 202 to power control unit 208, current 218 provided from battery power source(s) 210 to power control unit 208, as well as current 214 provided from power control unit 208 to system power source 212, which, as already described, may include current 216, and, in some instances, current 218. Similarly, current limit device(s) 220 may be configured to limit current 218 provided from power control unit 208 to battery power source(s) 210, when power control unit 208 is configured to charge battery power source(s) 210 using at least a part of current 216 received from USB power source 202, as will be described in greater detail below. In each instance, current limit device(s) 220 may be configured to limit the respective ones of currents 214, 216, and 218, to prevent excessive currents from being drawn from USB power source 202 and battery power source(s) 210 by power control unit 208, by battery power source(s) 210 when charging battery power source(s) 210, or by system power source 212 from power control unit 208, under normal operating conditions, as well as in cases of fault conditions, such as component failure (e.g., failure of one or more of the one or more components of device 200 included within logic device module 206).

Additionally, as also described above, power control unit 208 may further include battery charger(s) 222 configured to provide the charging functionality described above with reference to power control unit 208 and battery power source(s) 210. For example, to provide the charging functionality, battery charger(s) 222 may include one or more linear voltage regulator-based battery charging devices and/or related circuitry, switching voltage regulator-based battery charging devices and/or related circuitry, or any combination thereof.

Finally, in a similar manner as described above with reference to fault detection device(s) 230 of system power source 212, in the example of FIG. 2, fault detection device(s) 224 of power control unit 208 may be operable to communicate with at least one of the one or more of the components (once again, as depicted in FIG. 2, at least with processor(s) 234) via one or more fault condition signal(s) 244, to indicate any such fault conditions that may be present within power control unit 208 to the one or more components. As depicted in the example of FIG. 2, fault condition signal(s) 244 and 246 are combined into a single set, or a "bus," of fault condition signals. In other examples, fault condition signals 244, 246 may be used by fault detection device(s) 224 and 230, respectively, to communicate separately with the same or different ones of the one or more components of device 200 included within logic device module 206.

Although not shown in FIG. 2, each of processor(s) 234, memory device(s) 236, user interface device(s) 238, communication device(s) 240, and scanning interface device(s) 242 may also include one or more capacitive elements included within device 200 and electrically coupled to the respective one of these components. For example, the one or more capacitive elements may be configured to provide a supplemental electrical current to a particular component for a transitory period of time, defined based on a capacitance of the one or more capacitive elements. Generally speaking, such capacitive elements are ordinarily configured to provide only relatively short-term currents to loads. As such, the supplemental current provided by the one or more capacitive elements described above may be limited in magnitude and have a relatively short duration.

In the example of FIG. 2, power control unit 208 may comprise any suitable arrangement of hardware, software, firmware, or any combination thereof, to perform the techniques attributed to power control unit 208 in this disclosure. Examples of components that may be included within power control unit 208 (e.g., one or more switching devices and logic units for controlling the one or more switching devices, configured to perform the functionality attributed to power control unit 208 in this disclosure), in addition to the components depicted in FIG. 2, are described in greater detail below with reference to FIG. 3. In general, however, power control unit 208 may include any of one or more microprocessors, microcontrollers, digital signal processors (DSPs), application specific integrated circuits (ASICs), field programmable gate arrays (FPGAs), or any other equivalent integrated or discrete logic circuitry, as well as any combination of such components. Furthermore, power control unit 208 may include various types of analog circuitry, including one or more power semiconductor devices, in addition to, or in place of, the logic devices and circuitry described above.

Additionally, as also described above, power supply module 204 further includes battery power source(s) 210, which may include one or more nickel-metal hydride (NiMH), nickel-cadmium (NiCd), lithium ion (Li-ion), or lithium ion polymer (LiPo) battery elements, or any other battery-based energy storage systems or devices capable of providing an electrical current and being charged using an electrical current, as well as any combination thereof.

Also, although power supply module 204, logic device module 206, and the various components thereof are described as separate units or modules for conceptual purposes, in some examples, power supply module 204, power control unit 208, current limit device(s) 220, battery charger(s) 222, fault detection device(s) 224, battery power source(s) 210, system power source 212, voltage regulator(s) 226, current limit device(s) 228, fault detection device(s) 230, logic device module 206, processor(s) 234, memory device(s) 236, user interface device(s) 238, communication device(s) 240, scanning interface device(s) 242, and fault condition signal(s) 244, 246 may be functionally integrated in any of a variety of ways. For example, one or more of these components, units, and modules may be included within a common integrated circuit (IC) package, placed on a common printed circuit board (PCB), or located within a common enclosure or housing.

According to the techniques of this disclosure, as one example, power control unit 208 may be configured to provide current 214 to the one or more components of device 200 described above to perform the one or more operations. As previously explained, in the example of FIG. 2, the one or more components include processor(s) 234, memory device(s) 236, user interface device(s) 238, communication device(s) 240, and scanning interface device(s) 242, although in other examples, the one or more components may include more or fewer components than those depicted in FIG. 2. In this example, an external power terminal (not shown), which may include a corded electrical interface (e.g., a USB interface) of device 200, may be electrically coupled to power control unit 208 and configured to receive current 216 from USB power source 202 located outside of device 200. Also in this example, battery power source(s) 210 located within device 200 and also electrically coupled to power control unit 208 may be configured to provide current 218 to power control unit 208. In the above-described example, to provide current 214, power control unit 208 may be configured to determine a magnitude of current 214 that is required for the one or more components to perform the one or more operations, determine whether the magnitude of current 214 is greater than a current limit value associated with current 216, and, in the event the magnitude of current 214 is greater than the current limit value, provide current 216 in conjunction with current 218, and otherwise (i.e., in the event the magnitude of current 214 is less than or substantially equal to the current limit value), provide current 216.

As illustrated by the examples above, power control unit 208 determining the magnitude of first electrical current 214, determining whether the magnitude of first electrical current 214 is greater than the current limit value, and providing first electrical current 214 in the manner described by the examples above may, in some cases, enable device 200 to perform the one or more operations. For example, device 200, and, more specifically, one or more of processor(s) 234, memory device(s) 236, user interface device(s) 238, communication device(s) 240, and scanning interface device(s) 242, may perform the one or more operations in instances where the magnitude of first electrical current 214 is greater than the current limit value. As a result, device 200 may perform the one or more operations using second electrical current 216 received by device 200 from USB power source 202, in conjunction with third electrical current 218 received from battery power source(s) 210 located within device 200.

Additionally, as also illustrated by the examples above, and as will be explained in greater detail below, power control unit 208 may be further configured to charge battery power source(s) 210 using at least a portion of second electrical current 216, as well as detect and mitigate one or more faults associated with battery power source(s) 210 that may cause third electrical current 218 to be unavailable.

In this manner, device 200 of FIG. 2 represents an example of a corded electronic device comprising a power control unit configured to provide a first electrical current to one or more components of the corded electronic device to perform one or more operations, an external power terminal electrically coupled to the power control unit and configured to receive a second electrical current from an external power source located outside of the corded electronic device, and a battery power source located within the corded electronic device and electrically coupled to the power control unit. The battery power source is configured to provide a third electrical current to the power control unit. To provide the first electrical current, the power control unit is configured to determine a magnitude of the first electrical current that is required for the one or more components to perform the one or more operations, determine whether the magnitude of the first electrical current is greater than a current limit value associated with the second electrical current, and in the event the magnitude of the first electrical current is greater than the current limit value, provide the second electrical current in conjunction with the third electrical current to the one or more components as the first electrical current, and in the event the magnitude of the first electrical current is less than or substantially equal to the current limit value, provide the second electrical current to the one or more components as the first electrical current.

Figure 3:
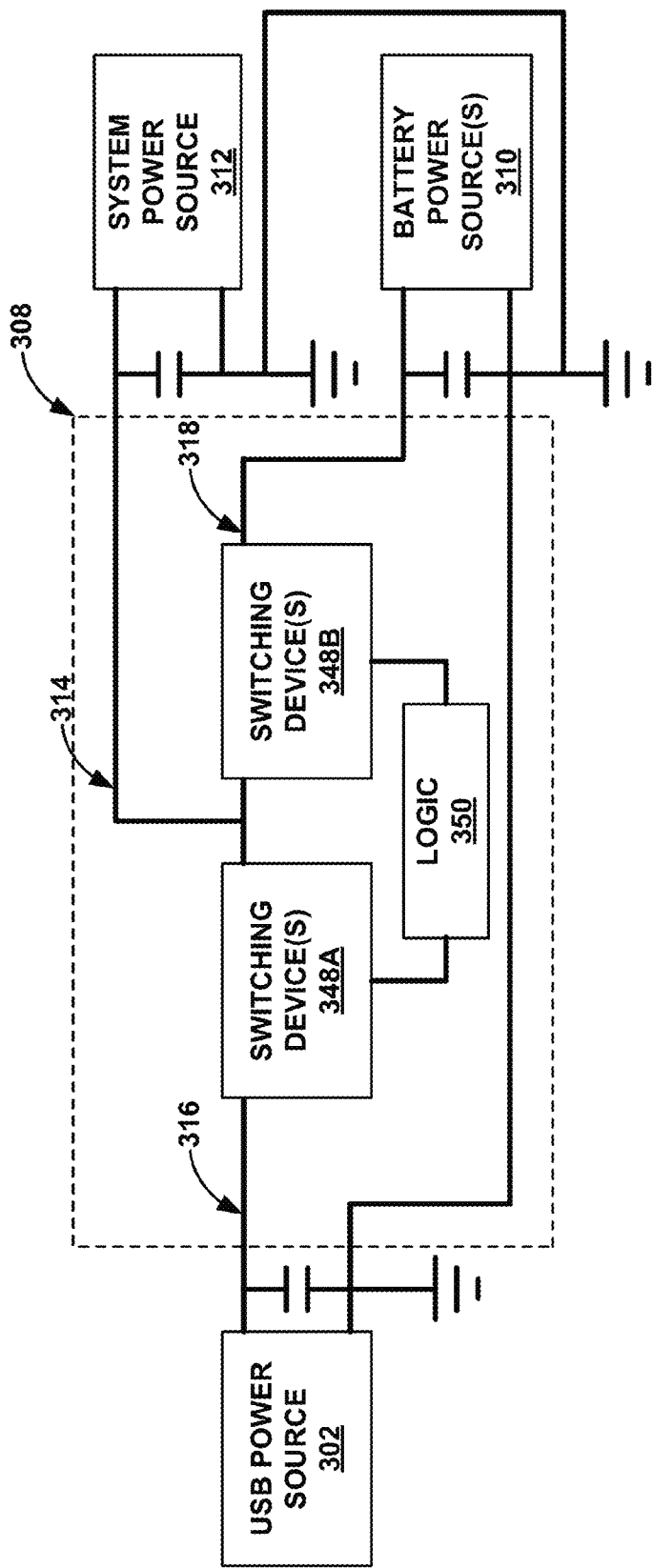
FIG. 3 is a detailed functional block diagram of one example of a power control unit of the example corded electronic device of FIG. 1, consistent with the techniques of this disclosure.

FIG. 3 is a detailed functional block diagram of one example of a power control unit of the example corded electronic device 100 of FIG. 1, consistent with the techniques of this disclosure. In other words, the power control unit 308 depicted in FIG. 3 is one example of power control unit 208 of device 200 described above with reference to FIG. 2. As shown in FIG. 3, power control unit 308 includes a logic unit 350 and one or more switching device(s) 348A and 348B. As also shown, power control unit 308 is electrically coupled to a USB power source 302, one or more battery power source(s) 310, and a system power source 312. As shown in FIG. 3, USB power source 302, battery power source(s) 310, and system power source 312 are referenced to a common ground node or "bus," as indicated by the common "ground" symbol shared by each of the respective sources. Additionally, as also shown, one or more capacitive elements are included for each of USB power source 302, battery power source(s) 310, and system power source 312, as indicated by a "capacitor" symbol shown as coupled to each of the respective sources, wherein each of the one or more capacitive elements may serve as noise decoupling capacitance, bulk capacitance, or any combination thereof.

In the example of FIG. 3, power control unit 308, battery power source(s) 310, and system power source 312 may be included within a corded electronic device (e.g., any of devices 100 and 200 of FIGS. 1 and 2, respectively), while USB power source 302 may be located outside of the corded electronic device.

In particular, in the example of FIG. 3, power control unit 308 is configured to provide a first electrical current 314 to system power source 312 via one or more of switching device(s) 348A, 348B. More specifically, as also shown, to provide current 314, power control unit 308 is configured to receive a second electrical current 316 from USB power source 302 via switching device(s) 348A. In some instances (e.g., when a magnitude of current 314 that is required for one or more components of the corded electronic device to perform one or more operations is greater than a current limit value associated with current 316), to provide current 314, power control unit 308 is further configured to receive a third electrical current 318 from battery power source(s) 310 via switching device(s) 348B. Additionally, as also shown, in still other instances (e.g., when the magnitude of current 314 is less than the current limit value, and when charging battery power source(s) 310), power control unit 308 is configured to provide at least a portion of current 316 as current 318 to battery power source(s) 310, rather than receiving current 318 from battery power device(s) 310.

For example, in FIG. 3, USB power source 302, current 316, power control unit 308, current 318, battery power source(s) 310, current 314, and system power source 312 may correspond to USB power source 202, current 216, power control unit 208, current 218, battery power source(s) 210, current 214, and system power source 212, respectively, as described above with reference to device 200 of FIG. 2.

In the example of FIG. 3, logic unit 350, in conjunction with switching device(s) 348A, 348B, may be configured to enable power control unit 308 to provide current 314 to system power source 312 in the manner described above, such that current 314 may include any combination of current 316 from USB source 302 and current 318 from battery power source(s) 310. For example, logic unit 350 may be configured to determine a magnitude of current 314 that is required for one or more components of the corded electronic device that includes power control unit 308, battery power source(s) 310, and system power source 312, to perform one or more operations. Logic unit 350 may be further configured to determine whether the magnitude of current 314 is greater than a current limit value associated with current 316. Additionally, logic unit 350 may be still further configured to control one or more of switching device(s) 348A, 348B to provide current 314 to the one or more components to perform the one or more operations. For example, to provide current 314, logic unit 350 may be configured to, in the event the magnitude of current 316 is greater than the current limit value, control switching device(s) 348A, 348B to provide current 316 in conjunction with current 318, and otherwise (i.e., in the event the magnitude of current 314 is less than or substantially equal to the current limit value), control only switching device(s) 348A to provide only current 316.

In some examples, in the event the magnitude of current 314 is less than the current limit value, to provide current 316, logic unit 350 may be configured to control switching device(s) 348A to provide a first portion of current 316 having a magnitude that is substantially equal to the magnitude of current 314. In these examples, logic unit 350 may be further configured to jointly control switching device(s) 348A, 348B to provide a second portion of current 316 having a magnitude that is substantially equal to a difference between the magnitude of current 314 and the current limit value to battery power source(s) 310 so as to charge battery power source(s) 310, until battery power source(s) 310 are substantially fully charged.

In other examples, logic unit 350 may be further configured to, in the event the magnitude of current 314 is greater than the current limit value, prior to controlling switching device(s) 348A, 348B to provide current 316 in conjunction with current 318, determining whether current 318 having a magnitude that is greater than or substantially equal to a difference between the magnitude of current 314 and the current limit value is available. In the event current 318 having the magnitude that is greater than or substantially equal to the difference between the magnitude of current 314 and the current limit value is available, logic unit 350 may be configured to control switching device(s) 348A, 348B to provide current 316 in conjunction with current 318, and otherwise, control only switching device(s) 348A to provide current 316 only. In these examples, logic unit 350 may be further configured to provide one or more signals (e.g., fault condition signal 244 of FIG. 2) indicative of the determination that current 318 having the magnitude that is greater than or substantially equal to the difference between the magnitude of current 314 and the current limit value is unavailable to the one or more components. Moreover, the corded electronic device may be configured adjust the one or more operations performed by the one or more components, such that the magnitude of current 314 that is required for the one or more components to perform the one or more operations is substantially equal to or less than the magnitude of current 316, based at least in part on the one or more signals.

Furthermore, in the example of FIG. 3, each of switching device(s) 348A, 348B may include any combination of one or more bipolar junction transistor (BJT)-based and metal oxide semiconductor field effect transistor (MOSFET)-based switching devices or circuitry, or other devices or circuitry, for providing the current provision, or current "switching" functionality attributed to power control unit 308 in this disclosure. For example, switching device(s) 348A, 348B may comprise any number of discrete or integrated electronic components or devices operable to enable power control unit 308 to provide current 314 to system power source 312. System power source 312 may, in turn, regulate current 314 as described in greater detail below, and provide a regulated version of current 314, which may include one or more voltages and/or currents, to the one or more components of the corded electronic device to perform the one or more operations. In a similar manner, switching device(s) 348A may be operable to enable power control unit 308 to provide current 316 from USB power source 302 to system power source 312, and switching device(s) 348B may be operable to enable power control unit 308 to provide current 318 from battery power source(s) 310 to system power source 312. Additionally, switching device(s) 348A, 348B may be jointly operable to enable power control unit 308 to provide at least a portion of current 316 from USB power source 302 to battery power source(s) 310 to charge battery power source(s) 310.

In any case, as previous explained, switching device(s) 348A, 348B may be controlled by logic unit 350 in order to operate in the manner described above. In some examples, logic unit 350 may include any of one or more microprocessors, microcontrollers, digital signal processors (DSPs), application specific integrated circuits (ASICs), field programmable gate arrays (FPGAs), or any other equivalent integrated or discrete logic circuitry, as well as any combination of such components.

Additionally, logic unit 350 and switching device(s) 348A, 348B may be configured as one or more discrete device(s), as depicted in FIG. 3, as well as one or more devices that are integrated in any manner. For example, logic unit 350 and switching device(s) 348A, 348B may be included within a common integrated circuit (IC) package, placed on a common printed circuit board (PCB), or located within a common enclosure or housing.

Finally, as previously described with reference to system power source 212 of FIG. 2, system power source 312 may comprise one or more power conversion devices or related circuitry configured to convert current 314 for use by the one or more components of the corded electrical device that includes power control unit 308, system power source 312, and battery power source(s) 310, to perform the one or more operations. For example, system power source 312 may include one or more linear voltage regulators, switching (which may also be referred to as "switch-mode) voltage regulators, or any combination thereof, that are configured to convert current 314 into one or more voltages and/or currents for use by the one or more components.

Figure 4A:
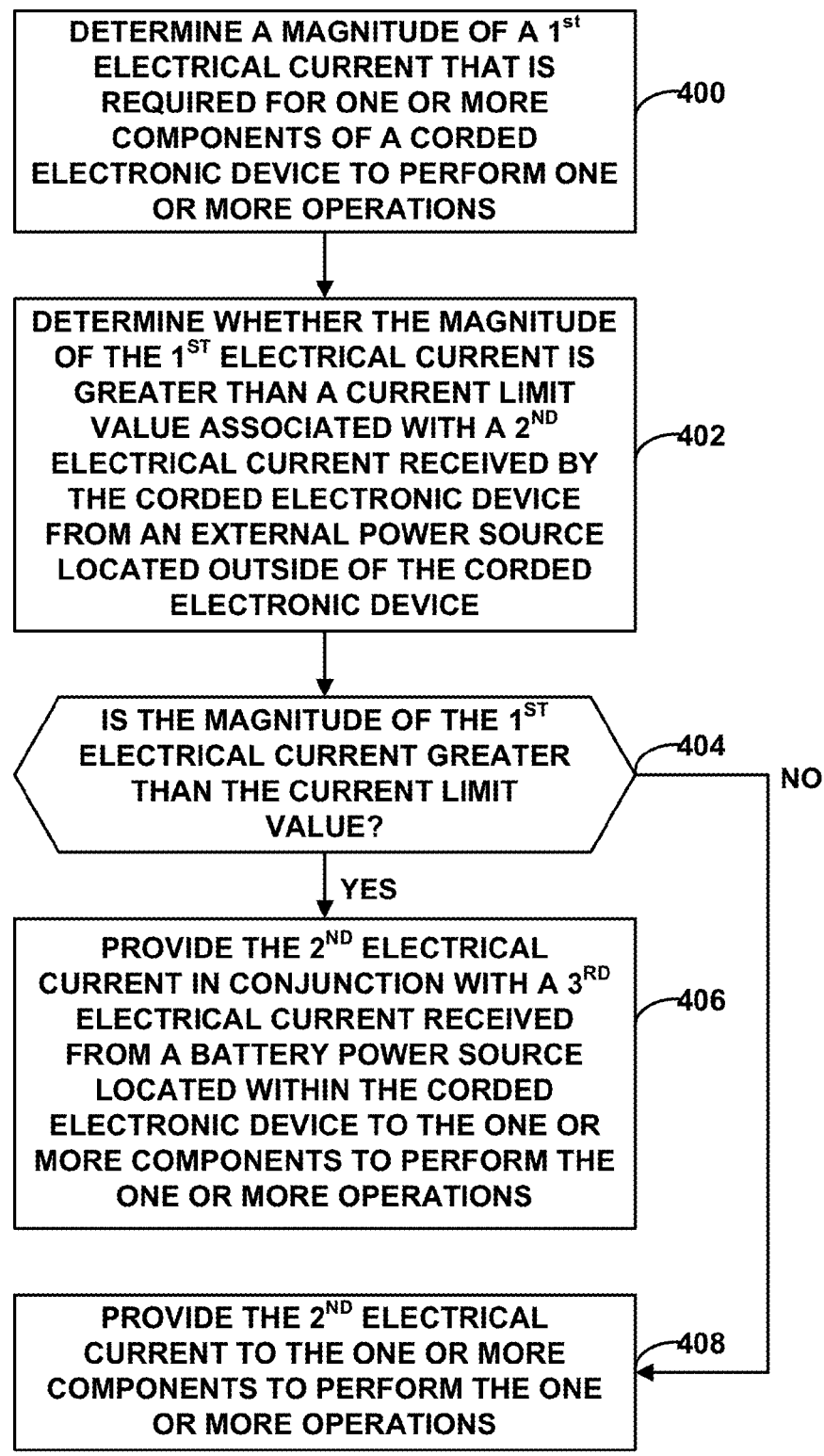
FIGS. 4A-4C are flow diagrams that illustrate example operation of a corded electronic device, consistent with the techniques of this disclosure.
Figure 4B:
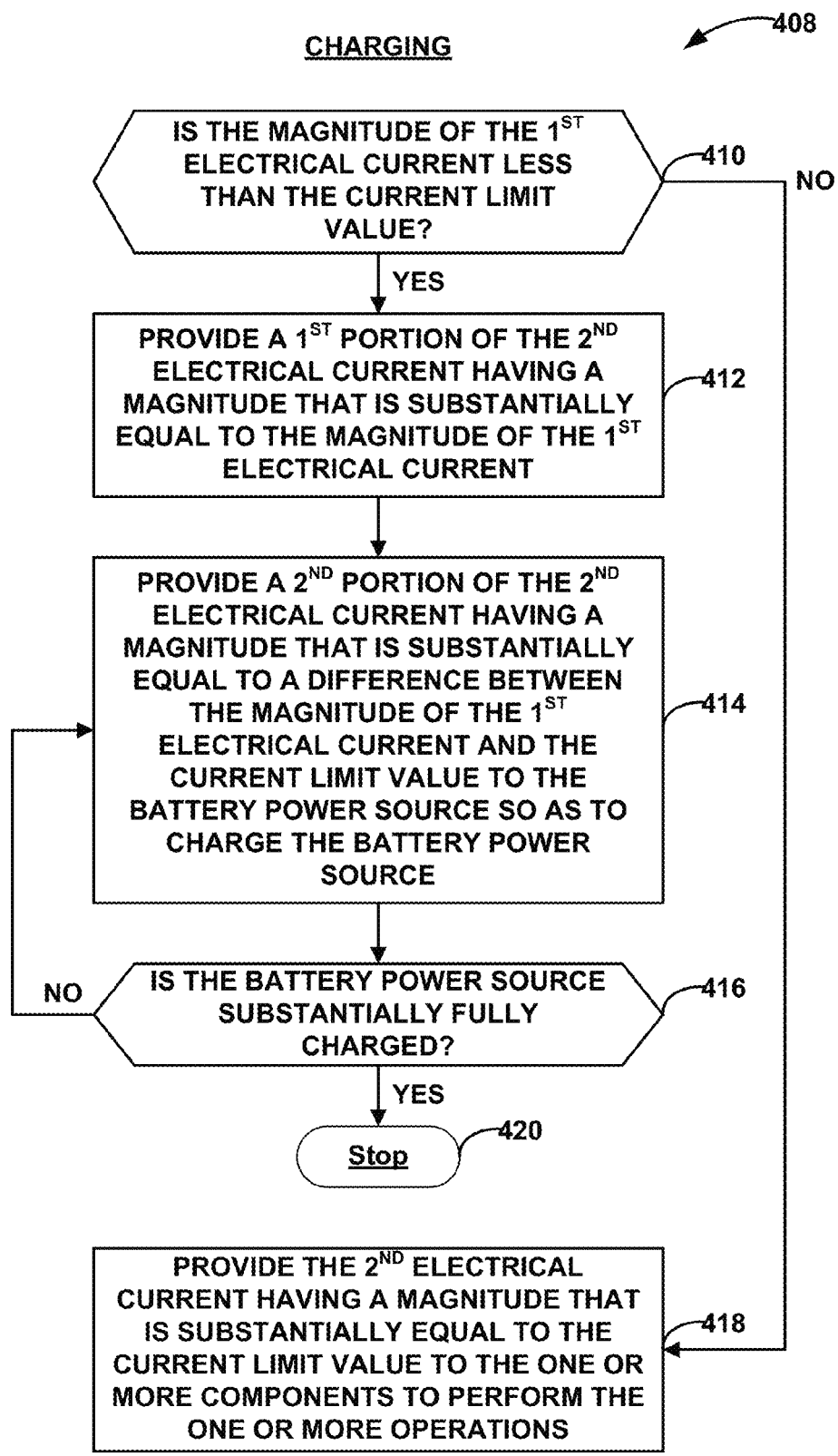
Figure 4C:
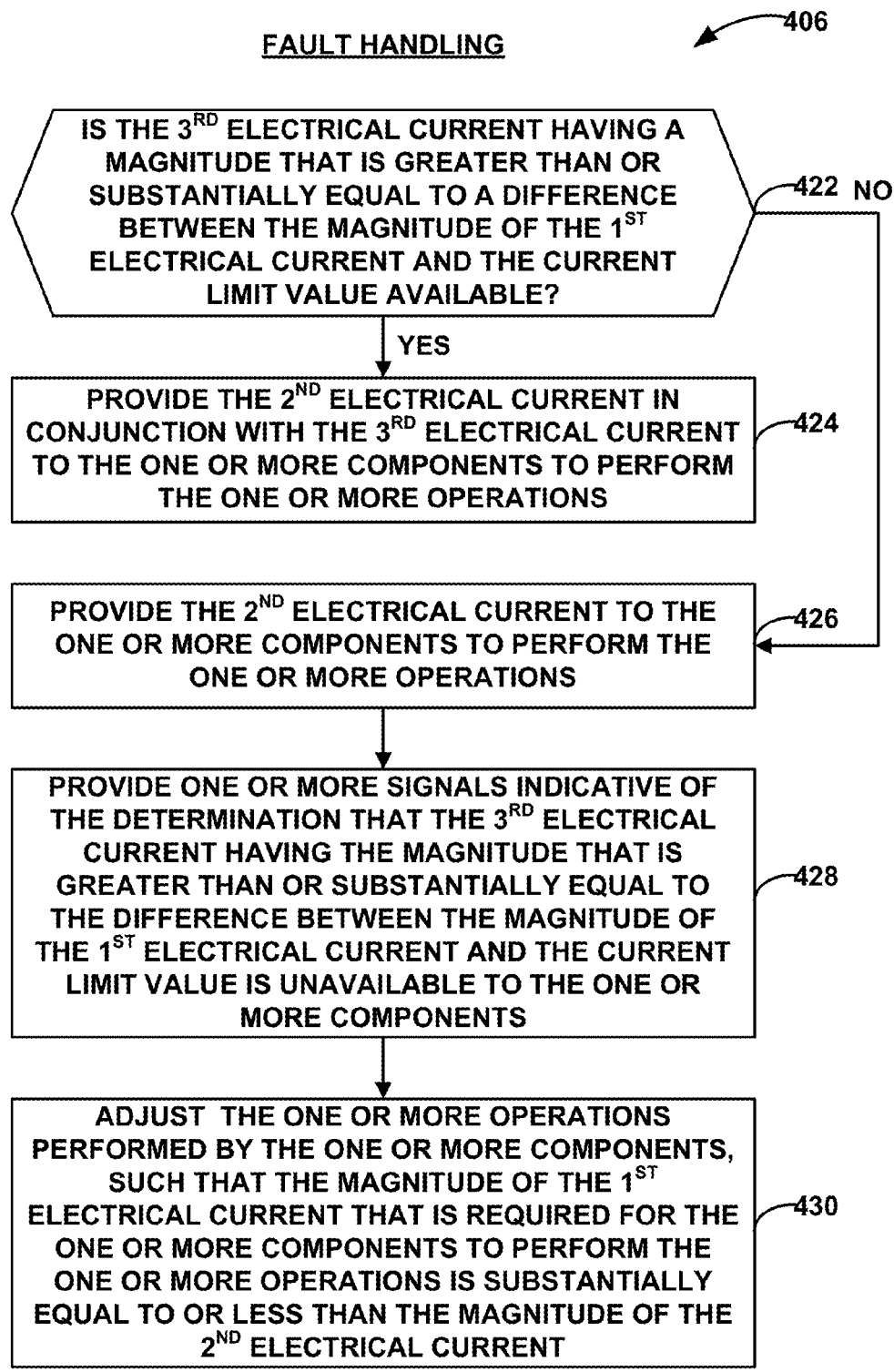

FIGS. 4A-4C are flow diagrams that illustrate example operation of a corded electronic device, consistent with the techniques of this disclosure. The techniques of FIGS. 4A-4C may generally be performed by any processing unit or processor, whether implemented in hardware, software, firmware, or any combination thereof, and when implemented in software or firmware, corresponding hardware may be provided to execute instructions for the software or firmware. For purposes of example, the techniques of FIGS. 4A-4C are described with respect to devices 100 (FIGS. 1) and 200 (FIG. 2), as well as various components thereof, although it should be understood that other systems or devices may be configured to perform similar techniques. Moreover, the steps illustrated in FIGS. 4A-4C may be performed in a different order or in parallel, and additional steps may be added and certain steps omitted, without departing from the techniques of this disclosure.

As shown in FIG. 4A, initially, a power control unit (e.g., power control unit 208) included within a corded electronic device (e.g., any of devices 100, 200) may determine a magnitude of a first electrical current that is required for one or more components (e.g., any of processor(s) 234, memory device(s) 236, user interface device(s) 238, communication device(s) 240, and scanning interface device(s) 242) of the corded electronic device to perform one or more operations (400). In some examples, in instances where the corded electronic device comprises a corded electronic scanning device, the one or more operations may relate to the scanning functionality of the corded electronic device described above with reference to FIG. 1. For example, the one or more operations may include lighting, image capture, and data processing operations performed by the coded electronic device.

The power control unit may further determine whether the magnitude of the first electrical current is greater than a current limit value associated with a second electrical current received by the corded electronic device from an external power source located outside of the corded electronic device (402). As previously described, the external power source may comprise an external battery-based power source (e.g., a battery pack) or another external power source (e.g., a "wall" power supply, such as a power adapter) electrically coupled to the corded electronic device via a cord so as to provide the second electrical current to the corded electronic device. Additionally, as will be described below, the current limit value associated with the second electrical current may be defined arbitrarily (e.g., by one or more parameters, such as current or power limits, of the external power source), as well as according to a particular standard or protocol, such as, e.g., the USB communications standard, that may be used to communicate with the corded electronic device via the cord.

The power control unit may still further provide the first electrical current to the one or more components to perform the one or more operations. For example, to provide the first electrical current, the power control unit may determine whether the magnitude of the first electrical current is greater than the current limit value (404). In the event the magnitude of the first electrical current is greater than the current limit value (404) ("YES"), the power control unit may provide the second electrical current in conjunction with a third electrical current received from a battery power source located within the corded electronic device (406). Otherwise, in the event the magnitude of the first electrical current is not greater than (i.e., is less than or substantially equal to) the current limit value (404) ("NO"), the power control unit may provide the second electrical current (408).

In some examples, in the event the magnitude of the first electrical current is greater than the current limit value, to provide the second electrical current in conjunction with the third electrical current, the power control unit may provide a sum of the second electrical current having a magnitude that is substantially equal to the current limit value and the third electrical current having a magnitude that is substantially equal to a difference between the magnitude of the first electrical current and the current limit value. In other examples, the power control unit may provide any combination of the second and third electrical currents, such as, e.g., a sum of the second electrical current having a magnitude that is less than the current limit value, and the third electrical current having a magnitude that is substantially equal to a difference between the magnitude of the first electrical current and the magnitude of the second electrical current. In other words, in some examples, the magnitude of the second electrical current may be less than a maximum magnitude of an electrical current available from the external power source, as defined by the current limit value. In these examples, the magnitude of the third electrical current may be greater than the difference between the magnitude of the first electrical current and the current limit value. In any case, the second electrical current in conjunction with the third electrical current may comprise the first electrical current having the magnitude that is required for the one or more components of the corded electronic device to perform the one or more operations.

As further shown in FIG. 4B, in some examples, in the event the magnitude of the first electrical current is not greater than the current limit value ((404) ("NO") of FIG. 4A), to provide the second electrical current to the one or more components to perform the one or more operations (408 of FIG. 4A), the power control module may also charge the battery power source. In other words, to perform step (408) of FIG. 4A described above, the power control unit may perform the following steps, as shown in FIG. 4B.

Initially, the power control unit may determine whether the magnitude of the first electrical current is less than the current limit value (410). In the event the magnitude of the first electrical current is less than the current limit value (410) ("YES"), to provide the second electrical current to the one or more components (408 of FIG. 4A), the power control unit may provide a first portion of the second electrical current having a magnitude that is substantially equal to the magnitude of the first electrical current (412).

The power control unit may further provide a second portion of the second electrical current having a magnitude that is substantially equal to a difference between the magnitude of the first electrical current and the current limit value to the battery power source so as to charge the battery power source (414). The power control unit may further determine whether the battery power source is substantially fully charged (416). In the event the battery power source is not substantially fully charged (416) ("NO"), the power control unit may repeat step (414) until the battery power source is substantially fully charged (416) ("YES"), following which the power control unit may stop charging the battery power source (420) ("STOP").

In the event the magnitude of the first electrical current is not less than the current limit value (410) ("NO"), however, indicating that the magnitude of the first electrical current is substantially equal to the current limit value, the power control unit may provide the second electrical current having the magnitude that is substantially equal to the current limit value to the one or more components to perform the one or more operations (418), without charging the battery power source. In this manner, in instances where the magnitude of the first electrical current is less than the current limit value, indicating that a portion of the maximum magnitude of the electrical current available from the external power source, as defined by the current limit value, is unused by the one or more components to perform the one or more operations, the power control unit may use this portion to charge the battery power source. In these instances, the second electrical current may include both the first and second portions of the second electrical current described above, wherein the first portion is used to provide the first electrical current to the one or more components to perform the one or more operations, and the second portion is used to charge the battery power source.

As still further shown in FIG. 4C, in some examples, in the event the magnitude of the first electrical current is greater than the current limit value ((404) ("YES") of FIG. 4A), to provide the second electrical current in conjunction with the third electrical current received from the battery power source located within the corded electronic device to the one or more components to perform the one or more operations (406 of FIG. 4A), the power control module may also detect one or more faults associated with the battery power source that may cause the third electrical current to be unavailable. In other words, to perform step (406) of FIG. 4A described above, the power control unit may perform the following steps, as shown in FIG. 4C.

Initially, in the event the magnitude of the first electrical current is greater than the current limit value, the power control unit may, prior to providing the second electrical current in conjunction with the third electrical current, determine whether the third electrical current having a magnitude that is greater than or substantially equal to a difference between the magnitude of the first electrical current and the current limit value is available (422). In the event the third electrical current having the magnitude that is greater than or substantially equal to the difference between the magnitude of the first electrical current and the current limit value is available (422) ("YES"), the power control unit may provide the second electrical current in conjunction with the third electrical current (406 of FIG. 4A), as previously described. Otherwise, in the event the third electrical current having the magnitude that is greater than or substantially equal to the difference between the magnitude of the first electrical current and the current limit value is unavailable (422) ("NO"), the power control unit may provide the second electrical current.

In some examples, in the event the third electrical current having the magnitude that is greater than or substantially equal to the difference between the magnitude of the first electrical current and the current limit value is unavailable (422) ("NO"), the power control unit may further provide one or more signals indicative of the determination that the third electrical current having the magnitude that is greater than or substantially equal to the difference between the magnitude of the first electrical current and the current limit value is unavailable to the one or more components (428). In still other examples, the corded electronic device that includes the power control unit may adjust the one or more operations performed by the one or more components, such that the magnitude of the first electrical current that is required for the one or more components to perform the one or more operations is substantially equal to or less than the magnitude of the second electrical current, based at least in part on the one or more signals (430).

In some examples, any combination of the one or more components (e.g., any of processor(s) 234, memory device(s) 236, user interface device(s) 238, communication device(s) 240, and scanning interface device(s) 242)) may perform the above-described adjustment. In one example, processor(s) 234 may select a different algorithm to perform the one or more operations based at least in part on the one or more signals, such that the magnitude of the first electrical current is substantially equal to or less than the magnitude of the second electrical current. For example, the algorithm may perform the one or more operations at a relatively slower rate and over a relatively longer period of time relative to another algorithm, while assuring that the magnitude of the first electrical current is substantially equal to or less than the magnitude of the second electrical current. In another example, any of a variety of clock generation devices and circuitry included within the corded electronic device and used to generate one or more clock signals for the one or more components may be manipulated based at least in part on the one or more signals, such that the magnitude of the first electrical current is substantially equal to or less than the magnitude of the second electrical current. For example, the devices and circuitry may be manipulated such that the one or more clock signals are adjusted to have relatively lower frequency values, resulting in the one or more components being operable at a relatively slower rate. In still another example, the one or more operations may be performed in a sequential, rather than a parallel manner, once again assuring that the magnitude of the first electrical current is substantially equal to or less than the magnitude of the second electrical current. As one example, the one or more operations may be performed sequentially, which may include performing one of the one or more operations after performing another one of the one or more operations. As another example, the one or more operations may be performed in an interleaved manner, which may include performing parts of one of the one or more operations and parts of another one of the one or more operations in an alternating manner In any case, in these examples, the corded electronic device may perform the one or more operations over a relatively longer period of time.

As one example of the interleaved operating mode of the corded electronic device described above, the device may perform a light feedback operation (e.g., via one or more LED elements included within the device) and a sound feedback operation (e.g., via one or more piezoelectric speaker, or "beeper," elements also included within the device). For example, the device may perform the light and sound feedback operations to indicate to a user of the device that a successful scanning operation of a particular barcode, or information-bearing indicia, generally, has occurred. In other examples, each of the light and sound feedback operations may be any of a number of other operations performed by the corded electronic device for any of a wide variety of purposes.

In this example, instead of performing the light and sound feedback operations concurrently (i.e., in parallel and at the same time), the operations may be performed in an interleaved manner so as to assure that the magnitude of the first electrical current is substantially equal to or less than the magnitude of the second electrical current. For example, to perform the sound feedback operation, a pulse-width modulated (PWM) drive signal defined by one or more periods each having a duration "T" and including a high (e.g., a positive-valued voltage and/or current) portion having a duration "$t_{on}$," (which may also be referred to as a pulse-width of the PWM drive signal) and a low (e.g., a zero-valued, or negative voltage and/or current) portion having a duration "$t_{off}$," may be used to actuate a particular beeper element. As a result, the beeper element may draw an electrical current only during the high portion of each period of the PWM drive signal, while drawing substantially no electrical current during the low portion of the respective period. Furthermore, to perform the light feedback operation, a particular LED element may be actuated during the low portion of each period of the PWM drive signal described above (e.g., using another PWM drive signal that is inverted relative to the PWM drive signal used to actuate the beeper element). In this manner, a total peak electrical current collectively drawn by the beeper and LED elements may be reduced by distributing the electrical current drawn by each element over time. Specifically, the total peak electrical current may be reduced by performing each of the light and sound feedback operations during its respective one of the high and low portions of each period of the PWM drive signal.

In the above-described example, because the PWM drive signal is operable to actuate the beeper and LED elements during different portions (i.e., the high and low portions) of each period of the PWM drive signal, relatively less electrical energy may be delivered to each element compared to using other techniques (e.g., when using direct current—(DC) based, or otherwise continuous drive signals). As a result, an intensity of each of the light and sound feedback signals generated by the elements may be relatively attenuated. For the same reason, the light and sound feedback signals may be discontinuous in nature. Nevertheless, because a frequency ("f", which may be defined as 1/T) of the PWM drive signal may, in some examples, be in the range of multiple kilohertz (kHz), the signals may be perceived by the user as continuous signals, each having a relatively attenuated amplitude. Additionally, in other examples, one or more of the elements may filter the PWM drive signal so as output a continuous light or sound feedback signal having an intensity that represents an average value of the PWM drive signal (e.g., as defined by a duty cycle "D" of the PWM drive signal), rather than varying according to the PWM drive signal itself In any case, the relatively attenuated intensities, and, in some cases, the discontinuous nature of the light and sound feedback signals may be sufficient to notify the user that the scanning operation was successful, in some examples.

In still other examples, in the event the magnitude of the first electrical current is greater than the current limit value, to provide the second electrical current in conjunction with the third electrical current, the power control unit may provide the third electrical current for a duration of time that is greater than a transitory period of time during which one or more capacitive elements included within the corded electronic device and electrically coupled to the one or more components provide a fourth electrical current to the one or more components. In some examples, the fourth electrical current may comprise a part of the first electrical current for the transitory period of time. In these examples, in the event the magnitude of the first electrical current is greater than the current limit value, to provide the second electrical current in conjunction with the third electrical current, the power control unit may perform the following steps. During the transitory period of time, the power control unit may provide a sum of the second electrical current having a magnitude that is substantially equal to the current limit value, and the third electrical current having a magnitude that is substantially equal to a difference between the magnitude of the first electrical current and a sum of the current limit value and a magnitude of the fourth electrical current. When outside of the transitory period of time (e.g., following the transitory period of time), however, the power control unit may provide a sum of the second electrical current having the magnitude that is substantially equal to the current limit value and the third electrical current having a magnitude that is substantially equal to a difference between the magnitude of the first electrical current and the current limit value.

In the above-described examples, the transitory period of time may be defined based at least in part on a capacitance of the one or more capacitive elements. For example, the transitory period of time for which the one or more capacitive elements may be configured to provide the fourth electrical current to the one or more components may be a function of the capacitance of the one or more capacitive elements, as well as other parameters, such as a voltage at which the fourth current is applied (e.g., a voltage across the one or more capacitive elements, which may be referred to as a "system" voltage) and the effective load presented by the one or more components to the one or more capacitive elements.

Finally, as described above, in some examples, the current limit value associated with the second electrical current may comprise a current limit value defined by the USB communications protocol. For example, the current limit value may comprise one of 100 mA and 500 mA, in instances where the corded electronic device is designated as a "low-power" device and a "high-power" device, respectively, according to the USB communications protocol. In other examples, the current limit value associated with the second electrical current may be arbitrarily defined, e.g., by one or more parameters, such as current or power limits, of the external power source, or according to another standard or protocol that may be used to communicate with the corded electronic device via a cord electrically coupling the corded electronic device and the external power source.

The power control unit determining the magnitude of the first electrical current, determining whether the magnitude of the first electrical current is greater than the current limit value, and providing the first electrical current in the manner described by the examples above may, in some cases, enable the corded electronic device to perform the one or more operations. For example, the corded electronic device, and, more specifically, the one or more components thereof, may perform the one or more operations in instances where the magnitude of the first electrical current is greater than the current limit value. As a result, the corded electronic device may perform the one or more operations using the second electrical current received by the corded electronic device from the external power source, in conjunction with the third electrical current received from the battery power source located within the corded electronic device.

In this manner, the method of each of FIGS. 4A-4C represents an example of a method of operating a corded electronic device, including determining a magnitude of a first electrical current that is required for one or more components of the corded electronic device to perform one or more operations, determining whether the magnitude of the first electrical current is greater than a current limit value associated with a second electrical current received by the corded electronic device from an external power source located outside of the corded electronic device, and providing the first electrical current to the one or more components to perform the one or more operations. Providing the first electrical current includes, in the event the magnitude of the first electrical current is greater than the current limit value, providing the second electrical current in conjunction with a third electrical current received from a battery power source located within the corded electronic device to the one or more components as the first electrical current, and in the event the magnitude of the first electrical current is less than or substantially equal to the current limit value, providing the second electrical current to the one or more components as the first electrical current.

Figure 5:
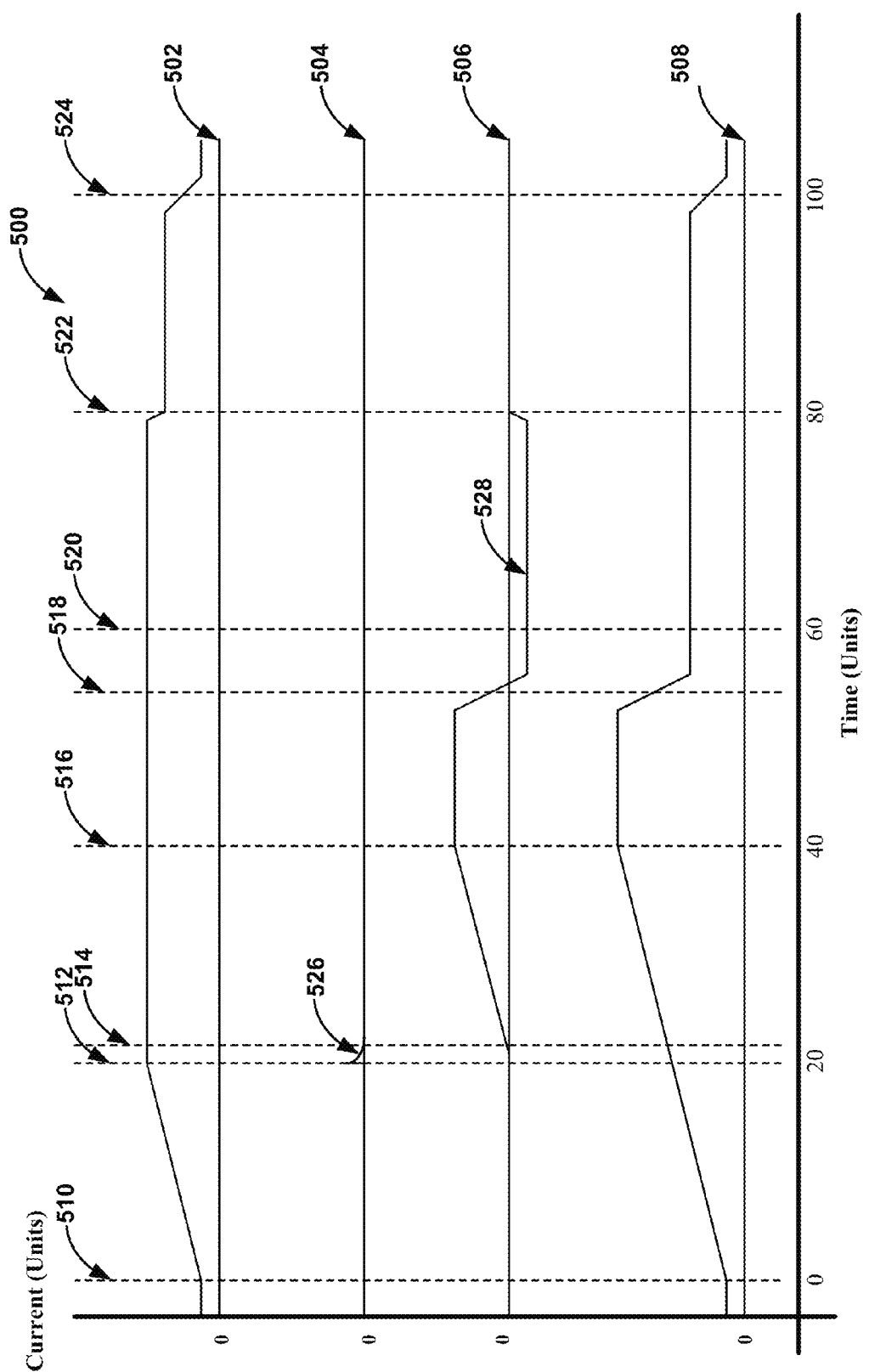
FIG. 5 is a graph that illustrates examples of electrical currents drawn over time by one or more components of a corded electronic device from an external power source, a battery power source, and one or more capacitive elements, consistent with the techniques of this disclosure.

FIG. 5 is a graph that illustrates examples of electrical currents drawn over time by one or more components of a corded electronic device from an external power source, a battery power source, and one or more capacitive elements, consistent with the techniques of this disclosure. In particular, FIG. 5 illustrates a first electrical current 508 drawn by a corded electronic device (e.g., any of device 100 of FIG. 1 and device 200 of FIG. 2), wherein first electrical current 508 is required for one or more components (e.g., any of processor(s) 234, memory device(s) 236, user interface device(s) 238, communication device(s) 240, and scanning interface device(s) 242 of device 200 of FIG. 2) of the corded electronic device to perform one or more operations. FIG. 5 further illustrates a second electrical current 502 received by the corded electronic device from an external power source (e.g., any of USB power sources 202 and 302 of FIGS. 2 and 3, respectively) located outside of the corded electronic device. FIG. 5 still further illustrates a third electrical current 506 received from a battery power source (e.g., any of battery power source(s) 210 and 310 of FIGS. 2 and 3, respectively) located within the corded electronic device. Additionally, FIG. 5 illustrates a fourth electrical current 504 received from one or more capacitive elements included within the corded electronic device and electrically coupled to the one or more components.

In the example of FIG. 5, currents 502-508 are depicted as occurring from a relative time 0 to a relative time 100, in increments of 20, wherein the relative time indicates a percentage of a period of time required for the corded electronic device to perform the one or more operations, thereby generating currents 502-508. Additionally, each of currents 502-508 is depicted as spanning a relative magnitude range centered around "0," wherein positive changes in magnitude of each of currents 502-508 within the respective magnitude range indicate changes in current drawn, and negative changes in magnitude, if any, of each of currents 502-508 within the respective magnitude range indicate changes in current consumed. Stated another way, any transitions of each of currents 502-508 within the respective range of magnitude merely indicate a change, i.e., any change, in current drawn from, or consumed by, the corresponding ones of the one or more components, the external power source, the battery power source, and the one or more capacitive elements. The relative time duration and relative ranges of magnitude described above are chosen for purposes of illustration and ease of explanation, such that no numerical values of time or current are used. In some non-limiting examples, however, the relative time duration may comprise multiple nanoseconds (nsec), microseconds (msec), or seconds (sec), and the relative ranges of magnitude may comprise multiple nanoamperes (nA), milliamperes (mA), or amperes (A).

As shown in FIG. 5, prior to time "0" (510), which may correspond to a period of time that occurs prior to the corded electronic device performing the one or more operations, current 508 has a baseline magnitude, which substantially corresponds to a magnitude of current 502. In other words, prior to time "0" (510), current 508 is drawn substantially entirely from the external power source. In this example, current 508 having the baseline magnitude may be used to provide "stand-by" or idling power to the one or more components, e.g., when the corded electronic device is placed in a stand-by, or idling mode of operation.

As further shown in FIG. 5, at time "0" (510), the corded electronic device begins to perform the one or more operations. Initially, between times "0" (510) and "20" (512), current 508 gradually increases from the baseline magnitude to a magnitude required for the one or more components of the corded electronic device to perform the one or more operations. As also shown, during this time period, current 502 increases correspondingly. In other words, between times "0" (510) and "20" (512), current 508 is once again drawn substantially entirely from the external power source.

As still further shown in FIG. 5, at time "20" (512), before current 508 reaches the magnitude required for the one or more components to perform the one or more operations, the magnitude of current 502 reaches a maximum magnitude, as defined by a current limit value associated with current 502. Because current 508 continues to gradually increase beyond time "20" (512), as explained above, after time "20" (512), current 508 is drawn from other power sources, in addition to the external power source. In particular, as shown in FIG. 5, starting at time "20" (512) and ending at a time relatively shortly thereafter (514), current 508 is drawn from current 504, in addition to current 502. The duration of time between times "20" (512) and (514) may be referred to as a "transitory period of time," because during this transitory period of time, current 508 is drawn from current 504 in the form of a single current pulse 526 having a relatively short duration.

As previously explained, pulse 526, and current 504 generally, are provided to the one or more components by the one or more capacitive elements included within the corded electronic device and electrically coupled to the one or more components. As also previously explained, capacitive elements are ordinarily configured to provide only relatively short-term currents to loads, such as, e.g., the one or more components described herein. As such, because current 504 is derived from the one or more capacitive elements, current 504 may be limited to have the properties of pulse 526 as depicted in FIG. 5, including the relatively short duration of pulse 526 illustrated in FIG. 5. For example, the duration of pulse 526 may be defined based at least in part on a capacitance of the one or more capacitive elements.

Furthermore, because between times "20" (512) and (514), current 508 is drawn from current 504 in the form of pulse 526 having the relatively short duration described above, in addition to current 502, and because after time "20" (512) the magnitude of current 502 has already reached its maximum magnitude, as defined by the current limit value, after time (514), current 508 can no longer be drawn from current 504. As such, current 508 must be drawn from yet another power source, in addition to the external power source. Accordingly, as further illustrated in FIG. 5, between times (514) and "40" (516), current 508 is drawn from current 506, in addition to current 502. For example, as shown in FIG. 5, as current 508 continues to gradually increase during this time period, current 506 increases correspondingly. In other words, because by time (514), current 504 is substantially fully depleted, between times (514) and "40" (516), current 508 is drawn substantially entirely from the external power source and the battery power source.

In the example of FIG. 5, current 508 is drawn from current 502 having a magnitude that is substantially equal to the current limit value, and current 506 having a magnitude that is substantially equal to a difference between the magnitude of current 508 and the current limit value. In other examples, current 508 may be drawn from current 502 having a magnitude that is less than the current limit value, and current 506 having a magnitude that is substantially equal to a difference between the magnitude of current 508 and current 502, i.e., the remaining magnitude of current required for current 508, in addition to the magnitude of current 502.

As still further shown in FIG. 5, at time "40" (516), current 508 reaches the magnitude required for the one or more components of the corded electronic device to perform the one or more operations. As also shown, current 508 maintains this magnitude while performing the one or more operations for a predetermined amount of time thereafter, ending at time (518). In a similar manner as described above with reference to the period of time between times (514) and "40" (516), between times "40" (516) and (518), current 508 is drawn substantially entirely from the external power source and the battery power source.

As still further shown in FIG. 5, upon completing performing the one or more operations a predetermined amount of time after time "40" (516), specifically, at time (518), current 508 decreases to an intermediate magnitude that may correspond to the corded electronic device performing functions other than the one or more operations described above. For example, the corded electronic device may proceed to perform further processing of data acquired and/or processed as part of the corded electronic device performing the one or more operations. As further shown by the decrease of current 506 at time (518), as a result of this decrease in current 508, the maximum magnitude of current 502, as defined by the current limit value, now becomes sufficient to draw current 508 from current 502 alone. In other words, because of the decrease in current 508 at time (518), the maximum magnitude of current 502 is greater than or equal to the intermediate magnitude of current 508, thereby resulting in current 506 no longer being drawn.

Additionally, as also shown in FIG. 5, because between times (514) and (518), current 508 was drawn from current 506, which is provided by the battery power source, the battery power source has been at least partially depleted. In this case, the corded electronic device may further charge the battery power source using any portion of the maximum magnitude of current 502 that exceeds the intermediate magnitude of current 508. Accordingly, as shown in FIG. 5, between times (518) and "80" (522), current 506 is consumed by, rather than drawn from, the battery power source so as to charge the battery power source, as indicated by the negative magnitude of current 506 during this period of time. Current 506 during this period of time, which corresponds to current pulse 528, may be referred to as a "charging" current of the battery power source. In the example of FIG. 5, during the same period of time, while current 508 has decreased to the intermediate magnitude as described above, current 502 maintains its maximum magnitude so as to provide the charging current to the battery power source. As also shown in FIG. 5, at time "80" (522), the battery power source is substantially fully charged, as indicated by current 506 returning to its initial magnitude of substantially "0."

As still further shown in FIG. 5, at time "80" (522), current 508 maintains the intermediate magnitude described above. However, because the battery power source is substantially fully charged after time "80" (522), as indicated by current 506 returning to its initial magnitude of substantially "0" (i.e., the battery power source is no longer consuming, or "drawing" any current from current 502 to charge the battery power source, while also not providing any current to current 508) current 502 decreases by an amount that substantially corresponds to the magnitude of current 506 between times (518) and "80" (522).

Finally, as also shown in FIG. 5, at time "100" (524), current 508 returns to substantially the same baseline magnitude of current 508 prior to time "0" (510), which may once again correspond to the corded electronic device being placed in a "stand-by," or idling mode of operation. As also shown, at time "100" (524), current 502 once again tracks current 508.

In the example of FIG. 5, currents 502-508 are depicted as increasing and decreasing linearly as well as non-linearly. In other examples, currents 502-508 may increase and decrease in a different manner so as to have any of a variety of characteristics, including increasing or decreasing linearly, piecewise-linearly, exponentially, and so forth. Additionally, in still other examples, the rates at which each of currents 502-508 increase and decrease may vary.

In this manner, the power control unit of the corded electronic device may provide current 508 to the one or more components of the corded electronic device to perform the one or more operations, wherein current 508 has a magnitude that is required for the one or more components to perform the one or more operations. For example, in instances where the magnitude of current 508 is greater than the current limit value associated with current 502, to provide current 508, the power control unit may provide current 502 in conjunction with current 506, as previously described. Otherwise, in instances where the magnitude of current 508 is not greater than the current limit value, the power control unit may provide current 508 by providing only current 502, as also previously described.

Additionally, in instances where the magnitude of current 508 is less than the current limit value, to provide current 508, the power control unit may provide a first portion of current 502 having a magnitude that is substantially equal to the magnitude of current 508. In the same instances, the power control unit may further provide a second portion of current 502 having a magnitude that is substantially equal to a difference between the magnitude of current 508 and the current limit value to the battery power source so as to charge the battery power source until the battery power source is substantially fully charged.

The techniques of this disclosure may be implemented in a wide variety of computer devices. Any components, units, or modules that have been described are provided to emphasize functional aspects, and do not necessarily require realization by different hardware units. The techniques described herein may also be implemented in hardware, software, firmware, or any combination thereof. Any features described as modules, units, or components may be implemented together in an integrated logic device, or separately as discrete but interoperable logic devices. In some cases, various features may be implemented as an integrated circuit device, such as an integrated circuit chip, or chipset.

If implemented in software, the techniques may be realized at least in part by a computer-readable storage medium storing instructions. When executed by one or more processors, the instructions may cause the one or more processors to perform one or more of the methods described above. The computer-readable storage medium may comprise a tangible computer-readable storage medium, and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disc (CD), digital versatile disc (DVD), Blu-ray disc, holographic data storage media, or other non-volatile storage device.

The memory, or memory devices, described herein, which may be used as part of the described techniques, may also be realized in any of a wide variety of memory, or memory devices, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A method of operating a corded electronic device, the method comprising:
   determining a magnitude of a first electrical current that is required for one or more components of the corded electronic device to perform one or more operations;
   determining whether the magnitude of the first electrical current is greater than a current limit value associated with a second electrical current received by the corded electronic device from an external power source located outside of the corded electronic device;
   determining whether a third electrical current having a magnitude that is greater than or substantially equal to a difference between the magnitude of the first electrical current and the current limit value is available or unavailable; and
   providing the first electrical current to the one or more components to perform the one or more operations, wherein providing the first electrical current comprises:
      in the event the magnitude of the first electrical current is greater than the current limit value and the third electrical current is available, providing the second electrical current in conjunction with the third electrical current received from a battery power source located within the corded electronic device to the one or more components as the first electrical current, wherein providing the second electrical current in conjunction with the third electrical current comprises providing a sum of the second electrical current having a magnitude that is substantially equal to the current limit value and the third electrical current having a magnitude that is substantially equal to a difference between the magnitude of the first electrical current and the current limit value,
      in the event the magnitude of the first electrical current is greater than the current limit value and the third electrical current is unavailable, providing one or more signals indicative of the determination that the third electrical current is unavailable, and
      in the event the magnitude of the first electrical current is less than or substantially equal to the current limit value, providing the second electrical current to the one or more components as the first electrical current, wherein providing the second electrical current comprises providing a first portion of the second electrical current having a magnitude that is substantially equal to the magnitude of the first electrical current and providing a second portion of the second electrical current having a magnitude that is substantially equal to a difference between the magnitude of the first electrical current and the current limit value to the battery power source so as to charge the battery power source, until the battery power source is substantially fully charged.

2. The method of claim 1, further comprising:
   adjusting the one or more operations performed by the one or more components, such that the magnitude of the first electrical current that is required for the one or more components to perform the one or more operations is substantially equal to or less than the magnitude of the second electrical current, based at least in part on the one or more signals.

3. The method of claim 1, wherein, in the event the magnitude of the first electrical current is greater than the current limit value, providing the second electrical current in conjunction with the third electrical current comprises:
   providing the third electrical current for a duration of time that is greater than a transitory period of time during which one or more capacitive elements included within the corded electronic device and electrically coupled to the one or more components provide a fourth electrical current to the one or more components.

4. The method of claim 3, wherein the fourth electrical current comprises a part of the first electrical current for the transitory period of time, and wherein, in the event the magnitude of the first electrical current is greater than the current limit value, providing the second electrical current in conjunction with the third electrical current comprises:
   during the transitory period of time, providing a sum of the second electrical current having a magnitude that is substantially equal to the current limit value, and the third electrical current having a magnitude that is substantially equal to a difference between the magnitude of the first electrical current and a sum of the current limit value and a magnitude of the fourth electrical current; and
   outside of the transitory period of time, providing a sum of the second electrical current having the magnitude that is substantially equal to the current limit value and the third electrical current having a magnitude that is substantially equal to a difference between the magnitude of the first electrical current and the current limit value.

5. The method of claim 3, wherein the transitory period of time is defined based at least in part on a capacitance of the one or more capacitive elements.

6. The method of claim 1, wherein the current limit value associated with the second electrical current comprises a current limit value defined by the Universal Serial Bus (USB) communications protocol.

7. A corded electronic device comprising:
   a power control unit configured to provide a first electrical current to one or more components of the corded electronic device to perform one or more operations;
   an external power terminal electrically coupled to the power control unit and configured to receive a second electrical current from an external power source located outside of the corded electronic device; and
   a battery power source located within the corded electronic device and electrically coupled to the power control unit, wherein the battery power source is configured to provide a third electrical current to the power control unit, wherein to provide the first electrical current, the power control unit is configured to:
determine a magnitude of the first electrical current that is required for the one or more components to perform the one or more operations;
determine whether the magnitude of the first electrical current is greater than a current limit value associated with the second electrical current;
determine whether the third electrical current having a magnitude that is greater than or substantially equal to a difference between the magnitude of the first electrical current and the current limit value is available or unavailable; and
in the event the magnitude of the first electrical current is greater than the current limit value, provide the second electrical current in conjunction with the third electrical current to the one or more components as the first electrical current,
in the event the magnitude of the first electrical current is greater than the current limit value and the third electrical current is unavailable, providing one or more signals indicative of the determination that the third electrical current is unavailable, and
in the event the magnitude of the first electrical current is less than or substantially equal to the current limit value, provide the second electrical current to the one or more components as the first electrical current,
wherein to provide the second electrical current in conjunction with the third electrical current, the power control unit is configured to provide a sum of the second electrical current having a magnitude that is substantially equal to the current limit value and the third electrical current having a magnitude that is substantially equal to a difference between the magnitude of the first electrical current and the current limit value,
wherein to provide the second electrical current, the power control unit is configured to provide a first portion of the second electrical current having a magnitude that is substantially equal to the magnitude of the first electrical current and providing a second portion of the second electrical current having a magnitude that is substantially equal to a difference between the magnitude of the first electrical current and the current limit value to the battery power source so as to charge the battery power source, until the battery power source is substantially fully charged.

8. The corded electronic device of claim 7, wherein the one or more components are configured to adjust the one or more operations performed by the one or more components, such that the magnitude of the first electrical current that is required for the one or more components to perform the one or more operations is substantially equal to or less than the magnitude of the second electrical current, based at least in part on the one or more signals.

9. The corded electronic device of claim 7, further comprising:
one or more capacitive elements included within the corded electronic device and electrically coupled to the one or more components, wherein the one or more capacitive elements are configured to provide a fourth electrical current to the one or more components for a transitory period of time, and
wherein, in the event the magnitude of the first electrical current is greater than the current limit value, to provide the second electrical current in conjunction with the third electrical current, the power control unit is configured to provide the third electrical current for a duration of time that is greater than the transitory period of time.

10. The corded electronic device of claim 9, wherein the fourth electrical current comprises a part of the first electrical current for the transitory period of time, and wherein, in the event the magnitude of the first electrical current is greater than the current limit value, to provide the second electrical current in conjunction with the third electrical current, the power control unit is configured to:
during the transitory period of time, provide a sum of the second electrical current having a magnitude that is substantially equal to the current limit value, and the third electrical current having a magnitude that is substantially equal to a difference between the magnitude of the first electrical current and a sum of the current limit value and a magnitude of the fourth electrical current; and
outside of the transitory period of time, provide a sum of the second electrical current having the magnitude that is substantially equal to the current limit value and the third electrical current having a magnitude that is substantially equal to a difference between the magnitude of the first electrical current and the current limit value.

11. The corded electronic device of claim 9, wherein the transitory period of time is defined based at least in part on a capacitance of the one or more capacitive elements.

12. A method of operating a corded electronic device, the method comprising:
determining a magnitude of a first electrical current that is required for one or more components of the corded electronic device to perform one or more operations;
determining whether the magnitude of the first electrical current is greater than a current limit value associated with a second electrical current received by the corded electronic device from an external power source located outside of the corded electronic device;
determining whether a third electrical current received from a battery power source located within the corded electronic device is available or unavailable; and
providing the first electrical current to the one or more components to perform the one or more operations, wherein providing the first electrical current comprises:
in the event the magnitude of the first electrical current is greater than the current limit value and the third electrical current is determined to be available, providing the second electrical current in conjunction with the third electrical current to the one or more components as the first electrical current,
in the event the magnitude of the first electrical current is greater than the current limit value and the third electrical current is determined to be unavailable, adjusting the one or more operations performed by the one or more components such that the magnitude of the first electrical current that is required for the one or more components to perform the one or more operations is substantially equal to or less than the magnitude of the second electrical current, and
in the event the magnitude of the first electrical current is less than or substantially equal to the current limit value, providing the second electrical current to the one or more components as the first electrical current.

13. The method of claim 12, wherein, in the event the magnitude of the first electrical current is greater than the current limit value and the third electrical current is determined to be available, providing the second electrical current in conjunction with the third electrical current comprises:

providing a sum of the second electrical current having a magnitude that is substantially equal to the current limit value and the third electrical current having a magnitude that is substantially equal to a difference between the magnitude of the first electrical current and the current limit value.

14. The method of claim 12, wherein, in the event the magnitude of the first electrical current is greater than the current limit value and the third electrical current is determined to be unavailable, the method further comprises providing one or more signals indicative of the determination that the third electrical current having a magnitude that is greater than or substantially equal to the difference between the magnitude of the first electrical current and the current limit value is unavailable to the one or more components.

15. The method of claim 12, wherein:
in the event the magnitude of the first electrical current is less than the current limit value, providing the second electrical current comprises providing a first portion of the second electrical current having a magnitude that is substantially equal to the magnitude of the first electrical current, the method further comprising:
providing a second portion of the second electrical current having a magnitude that is substantially equal to a difference between the magnitude of the first electrical current and the current limit value to the battery power source so as to charge the battery power source, until the battery power source is substantially fully charged.

16. The method of claim 12, wherein providing the second electrical current in conjunction with the third electrical current comprises:
providing the third electrical current for a duration of time that is greater than a transitory period of time during which one or more capacitive elements included within the corded electronic device and electrically coupled to the one or more components provide a fourth electrical current to the one or more components.

17. The method of claim 16, wherein the fourth electrical current comprises a part of the first electrical current for the transitory period of time, and wherein, in the event the magnitude of the first electrical current is greater than the current limit value, providing the second electrical current in conjunction with the third electrical current comprises:
during the transitory period of time, providing a sum of the second electrical current having a magnitude that is substantially equal to the current limit value, and the third electrical current having a magnitude that is substantially equal to a difference between the magnitude of the first electrical current and a sum of the current limit value and a magnitude of the fourth electrical current; and
outside of the transitory period of time, providing a sum of the second electrical current having the magnitude that is substantially equal to the current limit value and the third electrical current having a magnitude that is substantially equal to a difference between the magnitude of the first electrical current and the current limit value.

18. The method of claim 16, wherein the transitory period of time is defined based at least in part on a capacitance of the one or more capacitive elements.

19. The method of claim 12, wherein in the event the magnitude of the first electrical current is greater than the current limit value and the third electrical current is determined to be unavailable, adjusting the one or more operations performed by the one or more components comprises adjusting the one or more operations such that the one or more components are operable at a slower rate relative to the when the third electrical current is available.

20. The method of claim 12, wherein in the event the magnitude of the first electrical current is greater than the current limit value and the third electrical current is determined to be unavailable, adjusting the one or more operations performed by the one or more components to perform the one or more operations sequentially.

21. A corded electronic device comprising:
a power control unit configured to provide a first electrical current to one or more components of the corded electronic device to perform one or more operations;
an external power terminal electrically coupled to the power control unit and configured to receive a second electrical current from an external power source located outside of the corded electronic device; and
a battery power source located within the corded electronic device and electrically coupled to the power control unit, wherein the battery power source is configured to provide a third electrical current to the power control unit,
wherein to provide the first electrical current, the power control unit is configured to:
determine a magnitude of the first electrical current that is required for the one or more components to perform the one or more operations;
determine whether the magnitude of the first electrical current is greater than a current limit value associated with the second electrical current;
determine whether the third electrical current is available or unavailable;
in the event the magnitude of the first electrical current is greater than the current limit value and the third electrical current is determined to be available, providing the second electrical current in conjunction with the third electrical current to the one or more components as the first electrical current,
in the event the magnitude of the first electrical current is greater than the current limit value and the third electrical current is determined to be unavailable, adjusting the one or more operations performed by the one or more components such that the magnitude of the first electrical current that is required for the one or more components to perform the one or more operations is substantially equal to or less than the magnitude of the second electrical current, and
in the event the magnitude of the first electrical current is less than or substantially equal to the current limit value, providing the second electrical current to the one or more components as the first electrical current.

22. The corded electronic device of claim 21, wherein, in the event the magnitude of the first electrical current is greater than the current limit value and the third electrical current is determined to be available, to provide the second electrical current in conjunction with the third electrical current, the power control unit is configured to:
provide a sum of the second electrical current having a magnitude that is substantially equal to the current limit value and the third electrical current having a magnitude that is substantially equal to a difference between the magnitude of the first electrical current and the current limit value.

23. The corded electronic device of claim 21, wherein the battery power source is further configured to receive a fourth electrical current from the power control unit, wherein, in the event the magnitude of the first electrical current is less than the current limit value, to provide the second electrical current, the power control unit is configured to provide a first portion of the second electrical current having a magnitude that is substantially equal to the magnitude of the first electrical current, and wherein the power control unit is further configured to:

provide the fourth electrical current that corresponds to a second portion of the second electrical current having a magnitude that is substantially equal to a difference between the magnitude of the first electrical current and the current limit value to the battery power source so as to charge the battery power source, until the battery power source is substantially fully charged.

24. The corded electronic device of claim 21, wherein the power control unit is further configured to, in the event the third electrical current having a magnitude that is greater than or substantially equal to the difference between the magnitude of the first electrical current and the current limit value is unavailable, provide one or more signals indicative of the determination that the third electrical current having the magnitude that is greater than or substantially equal to the difference between the magnitude of the first electrical current and the current limit value is unavailable to the one or more components.

25. The corded electronic device of claim 21, further comprising:

one or more capacitive elements included within the corded electronic device and electrically coupled to the one or more components, wherein the one or more capacitive elements are configured to provide a fourth electrical current to the one or more components for a transitory period of time, and wherein, in the event the magnitude of the first electrical current is greater than the current limit value, to provide the second electrical current in conjunction with the third electrical current, the power control unit is configured to provide the third electrical current for a duration of time that is greater than the transitory period of time.

26. The corded electronic device of claim 25, wherein the fourth electrical current comprises a part of the first electrical current for the transitory period of time, and wherein, in the event the magnitude of the first electrical current is greater than the current limit value, to provide the second electrical current in conjunction with the third electrical current, the power control unit is configured to:

during the transitory period of time, provide a sum of the second electrical current having a magnitude that is substantially equal to the current limit value, and the third electrical current having a magnitude that is substantially equal to a difference between the magnitude of the first electrical current and a sum of the current limit value and a magnitude of the fourth electrical current; and outside of the transitory period of time, provide a sum of the second electrical current having the magnitude that is substantially equal to the current limit value and the third electrical current having a magnitude that is substantially equal to a difference between the magnitude of the first electrical current and the current limit value.

27. The corded electronic device of claim 26, wherein the transitory period of time is defined based at least in part on a capacitance of the one or more capacitive elements.

* * * * *